(12) United States Patent
Zhao et al.

(10) Patent No.: US 11,337,376 B2
(45) Date of Patent: May 24, 2022

(54) PLANT CULTIVATION DEVICE AND PLANT CULTIVATION METHOD

(71) Applicants: BOE OPTICAL SCIENCE AND TECHNOLOGY CO., LTD., Jiangsu (CN); BOE TECHNOLOGY GROUP CO., LTD., Beijing (CN)

(72) Inventors: Qingyang Zhao, Beijing (CN); Qing Qin, Beijing (CN)

(73) Assignees: BOE OPTICAL SCIENCE AND TECHNOLOGY CO., LTD., Jiangsu (CN); BOE TECHNOLOGY GROUP CO., LTD., Beijing (CN)

( * ) Notice: Subject to any disclaimer, the term of this patent is extended or adjusted under 35 U.S.C. 154(b) by 534 days.

(21) Appl. No.: 16/338,919

(22) PCT Filed: Sep. 26, 2018

(86) PCT No.: PCT/CN2018/107698
§ 371 (c)(1),
(2) Date: Apr. 2, 2019

(87) PCT Pub. No.: WO2019/148862
PCT Pub. Date: Aug. 8, 2019

(65) Prior Publication Data
US 2021/0329847 A1 Oct. 28, 2021

(30) Foreign Application Priority Data
Jan. 30, 2018 (CN) .......................... 201810089673.7

(51) Int. Cl.
*A01G 7/04* (2006.01)
*A01G 9/02* (2018.01)

(52) U.S. Cl.
CPC ............. *A01G 7/045* (2013.01); *A01G 9/023* (2013.01)

(58) Field of Classification Search
CPC .......... A01G 7/045; A01G 7/04; A01G 31/00; A01G 31/02; A01G 7/02; A01G 31/06
See application file for complete search history.

(56) References Cited

U.S. PATENT DOCUMENTS

| 5,323,567 A | 6/1994 | Nakayama et al. |
| 5,879,071 A | 3/1999 | Sanford, Jr. |

(Continued)

FOREIGN PATENT DOCUMENTS

| CN | 103814775 A | 5/2014 |
| CN | 104396609 A | 3/2015 |

(Continued)

OTHER PUBLICATIONS

The International Search Report and Written Opinion dated Nov. 14, 2018; PCT/CN2018/107698.

(Continued)

*Primary Examiner* — Kristen C Hayes (57) ABSTRACT

A plant cultivation device and a plant cultivation method are disclosed. The plant cultivation device includes: a holder including at least one plant cultivation layer; a lighting unit disposed in the at least one plant cultivation layer to allow light emitted from the lighting unit to irradiate a plant cultivated in the plant cultivation layer; an illuminance detecting unit configured to detect an illuminance in the plant cultivation layer to obtain an illuminance measurement; and a control unit configured to obtain the illuminance measurement and adjust a lighting intensity of the lighting unit according to the illuminance measurement.

15 Claims, 8 Drawing Sheets

(56) References Cited

U.S. PATENT DOCUMENTS

| | | | | |
|---|---|---|---|---|
| 10,098,364 B2* | 10/2018 | Ohta | | H05B 45/20 |
| 10,721,875 B2* | 7/2020 | Wargent | | F21V 29/70 |
| 10,743,480 B2* | 8/2020 | Probasco | | A01G 9/249 |
| 10,798,879 B1* | 10/2020 | Graves | | A01G 7/045 |
| 10,842,081 B2* | 11/2020 | Shur | | G01J 3/443 |
| 2001/0047618 A1* | 12/2001 | Fang | | A01G 7/045 |
| | | | | 47/65.5 |
| 2010/0115830 A1* | 5/2010 | Dube | | G01N 21/6486 |
| | | | | 47/17 |
| 2012/0054061 A1* | 3/2012 | Fok | | A01G 9/24 |
| | | | | 705/26.5 |
| 2013/0294065 A1* | 11/2013 | Wells | | A01G 7/045 |
| | | | | 362/231 |
| 2014/0060104 A1* | 3/2014 | Shur | | A61L 2/10 |
| | | | | 62/264 |
| 2015/0165079 A1* | 6/2015 | Shur | | F25D 17/042 |
| | | | | 250/455.11 |
| 2015/0305108 A1* | 10/2015 | Probasco | | A01G 22/00 |
| | | | | 47/58.1 LS |
| 2016/0345512 A1* | 12/2016 | Wargent | | A01G 7/045 |
| 2017/0099790 A1* | 4/2017 | Gonyer | | A01G 31/02 |
| 2018/0054975 A1* | 3/2018 | Shur | | A01G 7/045 |
| 2018/0235156 A1* | 8/2018 | Blair | | A01G 31/06 |
| 2019/0327907 A1* | 10/2019 | Ostman | | A01G 13/0237 |
| 2020/0236871 A1* | 7/2020 | Travaglini | | F24F 7/10 |
| 2021/0100172 A1* | 4/2021 | Chi | | A01G 9/18 |
| 2021/0204489 A1* | 7/2021 | Choi | | A01G 9/249 |

FOREIGN PATENT DOCUMENTS

| | | | | |
|---|---|---|---|---|
| CN | 204350720 U | | 5/2015 | |
| CN | 206533791 U | | 10/2017 | |
| JP | 2002-142585 A | | 5/2002 | |
| JP | 2012-183003 A | | 9/2012 | |
| JP | 6233623 B2 | | 11/2017 | |
| WO | WO-2019148862 A1 * | | 8/2019 | A01G 7/04 |

OTHER PUBLICATIONS

The Extended European Search Report dated Sep. 27, 2021; Appln. No. 18859943.5.

* cited by examiner

PLANT CULTIVATION DEVICE AND PLANT CULTIVATION METHOD

TECHNICAL FIELD

The present application claims priority to Chinese patent application No. 201810089673.7 filed on Jan. 30, 2018, the entire disclosure of which is incorporated herein by reference as part of the present application.

TECHNICAL FIELD

Embodiments of the present disclosure relate to a plant cultivation device and a plant cultivation method.

BACKGROUND

Light irradiation is one of the most basic conditions for growth of plants, and plants can growth normally only under a light condition. Generally, the plant can produce sugar from water and carbon dioxide under the light condition so as to obtain nutrients, which is a basis of vital movement for the plant and is referred to as the photosynthesis. A light intensity required for the photosynthesis is varied depending on the type of the plant. Currently, either natural light or artificial light is utilized for plant cultivation.

SUMMARY

At least one embodiment of the present disclosure provides a plant cultivation device, including: a holder including at least one plant cultivation layer, a lighting unit disposed in the at least one plant cultivation layer and configured to emit light irradiating a plant cultivated in the plant cultivation layer; an illuminance detecting unit configured to detect an illuminance in the plant cultivation layer to obtain an illuminance measurement. The plant cultivation device further includes a control unit configured to obtain the illuminance measurement and adjust a lighting intensity of the lighting unit according to the illuminance measurement.

For example, the plant cultivation device provided by at least one embodiment of the present disclosure further includes a storage unit configured to store an objective illuminance value.

For example, in the plant cultivation device provided by at least one embodiment of the present disclosure, the objective illuminance value includes a maximum illuminance value and a minimum illuminance value; the control unit is configured to obtain the illuminance measurement, compare the illuminance measurement with the maximum illuminance value of the illuminance detecting unit and the minimum illuminance value, respectively, and adjust the lighting intensity according to a comparative result.

For example, the plant cultivation device provided by at least one embodiment of the present disclosure includes a plurality of lighting units, and the plurality of lighting units are distributed in the plant cultivation layer.

For example, the plant cultivation device provided by at least one embodiment of the present disclosure includes a plurality of illuminance detecting units, and the plurality of illuminance detecting units are distributed in the plant cultivation layer.

For example, in the plant cultivation device provided by at least one embodiment of the present disclosure, the plant cultivation layer includes a plant shelf in a rectangle shape, the plurality of lighting units are disposed uniformly in the plant cultivation layer, and the plurality of illuminance detecting units are disposed on the plant shelf along one diagonal line of the plant shelf.

For example, in the plant cultivation device provided by at least one embodiment of the present disclosure, the plant cultivation layer includes a plurality of regions, and the plurality of illuminance detecting units and the plurality of lighting units are distributed uniformly in the plurality of regions.

For example, in the plant cultivation device provided by at least one embodiment of the present disclosure, the lighting unit includes one or more selected from the group of LED lamp, fluorescent lamp and incandescent lamp.

For example, the plant cultivation device provided by at least one embodiment of the present disclosure includes a plurality of plant cultivation layers.

For example, the plant cultivation device provided by at least one embodiment of the present disclosure further includes a top plant cultivation layer disposed on the at least one plant cultivation layer, and the top plant cultivation layer is not provided with the lighting unit and the illuminance detecting unit.

At least one embodiment of the present disclosure provides a plant cultivation method, including: irradiating a plant cultivated in at least one plant cultivation layer by using a lighting unit; detecting a light irradiation received by the plant in the plant cultivation layer to obtain an illuminance measurement; and adjusting a lighting intensity of the lighting unit according to the illuminance measurement.

For example, the plant cultivation method provided by at least one embodiment of the present disclosure further includes: setting an objective illuminance value; comparing the illuminance measurement with the objective illuminance value and then adjusting the lighting intensity of the lighting unit.

For example, in the plant cultivation method provided by at least one embodiment of the present disclosure, setting an objective illuminance value includes setting a maximum illuminance value and a minimum illuminance value of the plant, and the method includes: obtaining the illuminance measurement from an illuminance detecting unit, comparing the illuminance measurement with the maximum illuminance value and the minimum illuminance value, respectively, and adjusting the lighting intensity of the lighting unit according to a comparative result.

For example, in the plant cultivation method provided by at least one embodiment of the present disclosure, adjusting the lighting intensity of the lighting unit so that the illuminance measurement of the illuminance detecting unit corresponding to the lighting unit is in the range between the minimum illuminance value and the maximum illuminance value.

For example, in the plant cultivation method provided by at least one embodiment of the present disclosure, detecting the light irradiation received by the plant in the plant cultivation layer by using a plurality of illuminance detecting units to obtain illuminance measurements of the plurality of illuminance detecting units; and stopping adjusting the lighting intensity of the lighting unit upon the illuminance measurement of the illuminance detecting unit being in the range between the minimum illuminance value and the maximum illuminance value.

For example, in the plant cultivation method provided by at least one embodiment of the present disclosure, detecting the light irradiation received by the plant in the plant cultivation layer by using a plurality of illuminance detecting units to obtain illuminance measurements of the plurality of illuminance detecting units; comparing a maximum illuminance measurement with a minimum illuminance measurement to obtain a first difference value, and stopping adjusting the lighting intensity of the lighting unit upon the first difference value being smaller than or equal to a predetermined difference value; calculating an average value of the illuminance measurements upon the first difference value being greater than the predetermined difference value, comparing the average value with the maximum illuminance measurement to obtain a second difference value and comparing the average value with the minimum illuminance measurement to obtain a third difference value; lowering the lighting intensity of the lighting unit corresponding to the maximum illuminance measurement upon the second difference value being greater than the third difference value, and raising the lighting intensity of the lighting unit corresponding to the minimum illuminance measurement upon the second difference value being smaller than or equal to the third difference value, until the first difference value between the maximum illuminance measurement and the minimum illuminance measurement among the illuminance measurements of the plurality of illuminance detecting units is smaller than or equal to the predetermined difference value.

For example, in the plant cultivation method provided by at least one embodiment of the present disclosure, uniformly dividing the plant cultivation layer into a plurality of regions; for the region, irradiating the plant by using the lighting unit; detecting the light irradiation received by the plant by using the illuminance detecting unit to obtain the illuminance measurement; and adjusting the lighting intensity of the lighting unit according to the illuminance measurement.

For example, in the plant cultivation method provided by at least one embodiment of the present disclosure, adjusting the lighting intensity of the lighting unit according to the illuminance measurement in real time.

For example, in the plant cultivation method provided by at least one embodiment of the present disclosure, the lighting unit includes one or more selected from the group of LED lamp, fluorescent lamp and incandescent lamp.

BRIEF DESCRIPTION OF THE DRAWINGS

Hereinafter, the drawings accompanying embodiments of the present disclosure are simply introduced in order to more clearly explain technical solution(s) of the embodiments of the present disclosure. Obviously, the described drawings below are merely related to some of the embodiments of the present disclosure without constituting any limitation thereto.

DETAILED DESCRIPTION

In order to make objects, technical details and advantages of the embodiments of the disclosure apparent, technical solutions according to the embodiments of the present disclosure will be described clearly and completely as below in conjunction with the accompanying drawings of embodiments of the present disclosure. Apparently, the described embodiments are only a part of but not all of exemplary embodiments of the present disclosure. Based on the described embodiments of the present disclosure, various other embodiments can be obtained by those of ordinary skill in the art without creative labor and those embodiments shall fall into the protection scope of the present disclosure.

Unless otherwise defined, the technical terminology or scientific terminology used herein should have the same meaning as commonly understood by one of ordinary skill in the art to which this disclosure belongs. Likewise, terms like "first," "second," etc., which are used in the description and the claims of the present application for disclosure, are not intended to indicate any sequence, amount or importance, but distinguish various components. The phrases "connect", "connected", etc., are not intended to define a physical connection or mechanical connection, but may include an electrical connection, directly or indirectly. "On," "under," "left," "right" or the like is only used to describe a relative positional relationship, and when the absolute position of a described object is changed, the relative positional relationship might also be changed accordingly.

As mentioned above, a light intensity required for the photosynthesis is varied depending on the type of the plant. For photophilous plants, the photosynthesis can only be occurred under stronger light; for some shade tolerant plants, the photosynthesis can be occurred even under weaker light. Generally, when an intensity of light irradiation subjected by the plant is not sufficient for the photosynthesis to be occurred, the plant may grow slowly. Light irradiation with sufficient intensity may facilitate a fast growth of the plant. Fast growth of the plant is very important for plant factories with vegetable cultivation business.

During researching, inventors of the present disclosure noted that, in the existing plant cultivation that utilizes merely nature light, light irradiation required by the plant is totally dependent on a supply from the sun; as a result, a conventional cultivation device can only cultivate a single layer of vegetables, which has higher requirement on lands resources and also results in poor utilization of lands. Additionally, if the plant is cultivated by using merely artificial light, considering the huge power consumption resulted by the artificial light and the difficulty of realizing a full spectrum of the nature light through the spectrum of the artificial light, the growth and development of the plant may be negatively influenced. In such case, for example, a solution of cultivation in multiple layers is proposed, in which both of the nature light and the artificial light are utilized to provide the growth of plant with light irradiation. However, if the light irradiation subjected by the plants is not uniform, the growth rate of the plants in a same batch may be affected in such a manner that, the plant receiving sufficient light irradiation would growth faster while the plant receiving insufficient light irradiation would grow slowly, which results in different growth rates of the plants in a same batch.

At least one embodiment of the present disclosure provides a plant cultivation device, including: a holder, a lighting unit, an illuminance detecting unit and a control unit. The holder includes at least one plant cultivation layer; the lighting unit is disposed in the at least one plant cultivation layer to allow light emitted from the lighting unit to irradiate a plant cultivated in the plant cultivation layer; the illuminance detecting unit is configured to detect a light irradiation in the plant cultivation layer to obtain an illuminance measurement; the control unit is configured to obtain the illuminance measurement and adjust a lighting intensity of the lighting unit according to the illuminance measurement.

At least one embodiment of the present disclosure provides a plant cultivation method, including: irradiating a plant cultivated in at least one plant cultivation layer by using a lighting unit; detecting a light irradiation received by the plant in the plant cultivation layer to obtain an illuminance measurement; and adjusting a lighting intensity of the lighting unit according to the illuminance measurement.

Hereinafter, the plant cultivation device and the plant cultivation method of the present disclosure will be described with reference to several particular embodiments.

Figure 1A:
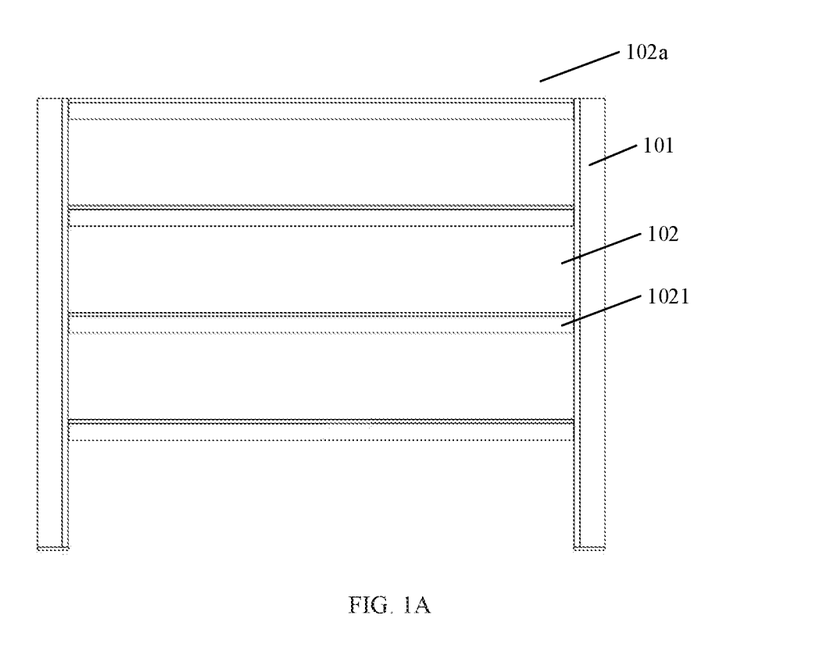
FIG. 1A is a schematic diagram of a plant cultivation device provided by an embodiment of the present disclosure.

At least one embodiment of the present disclosure provides a plant cultivation device, as illustrated in FIG. 1A, the plant cultivation device includes: a holder 101, a lighting unit, an illuminance detecting unit and a control unit. The holder 101 includes at least one plant cultivation layer 102; the lighting unit is disposed in the at least one plant cultivation layer 102 to allow light emitted from the lighting unit to irradiate a plant cultivated in the plant cultivation layer 102; the illuminance detecting unit is configured to detect an illuminance in the plant cultivation layer to obtain an illuminance measurement; the control unit is configured to obtain the illuminance measurement and adjust a lighting intensity of the lighting unit according to the illuminance measurement.

For example, FIG. 1 illustrates a plant cultivation device including four plant cultivation layers 102 (including a top plant cultivation layer 102a) provided by the present embodiment; in other embodiments, the number of the plant cultivation layer may be one, two, three, five, and the like, which is not limited in the present embodiment. In the present embodiment, the arrangement of the plurality of plant cultivation layers can improve a utilization ration of space so that more plants can be cultivated in a same space, thereby improving a productivity.

In the present embodiment, the lighting unit can be used as a replenishment unit of artificial light to provide the plant with a supplementary light irradiation under the circumstance of insufficient light irradiation, which on one aspect allows the plant to receive natural lighting with full spectrum and on the other aspect allows the plant to obtain a supplementary light irradiation when there is no sufficient natural lighting.

In the present embodiment, the holder 101 can adopt, for example, a metallic material, a wood material, a plastic material or a combination thereof, without limited in the present embodiment.

Figure 2A:
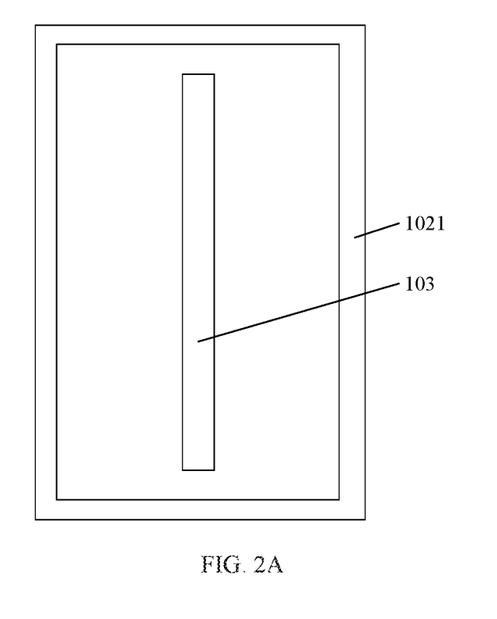
FIG. 2A is a schematic diagram illustrating an arrangement of a plurality of lighting units provided by an embodiment of the present disclosure.

For example, as illustrated in FIG. 1, the plant cultivation layers 102 in the holder 101 can be separated by a plant shelf 1021, and the plant is cultivated above the plant shelf 1021. The lighting unit for example can be disposed above the plant cultivation layer 102 to enable the light emitted from the lighting unit irradiating the plant; for example, the lighting unit can be disposed at a lower surface of a plant shelf 1021 of a previous plant cultivation layer or the top plant cultivation layer, so that the light emitted from the lighting unit can irradiate the plant in the plant cultivation layer 102 below this plant shelf 1021; or the lighting unit can be fixed above the plant cultivation layers 102 by means of a fixing mechanism (e.g., a stand). The lighting unit for example can be a point light source, a line light source, an area light source, or the like, without limited in the present embodiment. As illustrated in FIG. 2A, in the present embodiment, the lighting unit 103 for example is a line light source and is disposed at a central position of a lower surface of the plant shelf 1021 of every plant cultivation layer, so that the light emitted from the lighting unit 103 can irradiate the plant cultivated below the lighting unit 103.

Figure 2B:
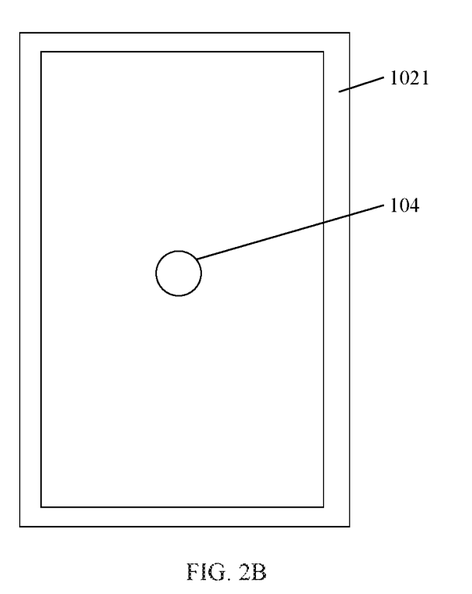
FIG. 2B is a schematic diagram illustrating an arrangement of a plurality of illuminance detecting units provided by an embodiment of the present disclosure.

For example, the illuminance detecting unit can be disposed around the plant cultivated in the plant cultivation layer 102; for example, the illuminance detecting unit can be disposed on an upper surface of the plant shelf 1021 of the plant cultivation layer 102 where the plant shelf 1021 is located, or is fixed around the plant by means of a fixing device (e.g., a stand), so as to detect an intensity of light irradiation received by the plant. As illustrated in FIG. 2B, in the present embodiment, the illuminance detecting unit 104 for example can be disposed at a central position of an upper surface of the plant shelf 1021. In other embodiments, the illuminance detecting unit for example can be movable so as to be moved to a desirable position according to demands. For example, the illuminance detecting unit can be movable manually, or movable by means of a guide rail or the like.

Figure 1B:
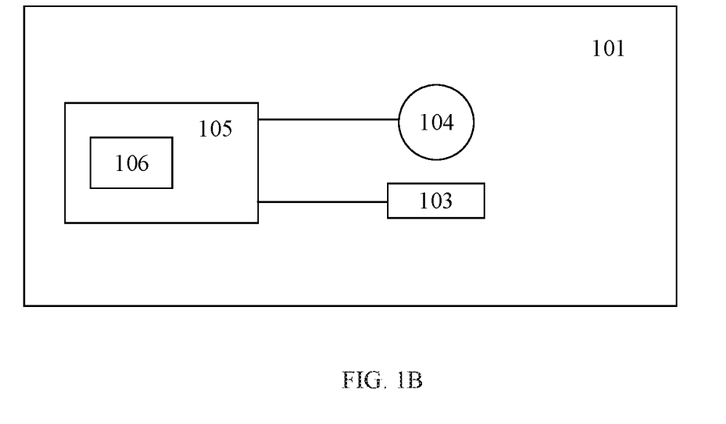
FIG. 1B and FIG. 1C are schematic diagrams illustrating a connecting relationship of a control unit in the plant cultivation device provided by an embodiment of the present disclosure.
Figure 1C:
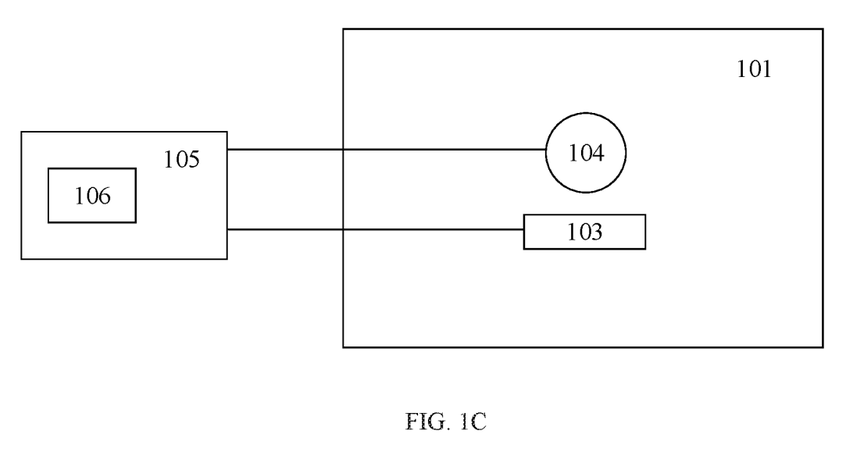

For example, the control unit can be configured to obtain the illuminance measurement of the illuminance detecting unit and adjust the lighting intensity of the lighting unit according to the illuminance measurement. The control unit can be a controller in any form, for example, a microcontroller, a single chip, a programmable logic controller (PLC), a personal computer or the like, without limited in the present embodiment. For example, as illustrated in FIG. 1B, the control unit 105 can be disposed at any appropriate position on the holder 101, and can be connected to the lighting unit 103 and the illuminance detecting unit 104 in the plant cultivation device through a wireless signal or a wired signal, as long as it doesn't affect a cultivation of the plant. For example, as illustrated in FIG. 1C, the control unit 105 may not be disposed on the holder 101 but is disposed at any position convenient for a plant grower, for example, in a work room of the plant grower, and the control unit 105 is connected to the lighting unit 103 and the illuminance detecting unit 104 in the plant cultivation device through a wireless signal or a wired signal so as to facilitate monitoring the plant cultivation device by the plant grower.

For example, the plant cultivation device provided by the present embodiment can adjust the lighting intensity of the lighting unit of the plant according to the intensity of light irradiation (illuminance) received by the plant, so that the plant can receive a light irradiation with an objective intensity. When a plurality of plants is cultivated in batches, the plants can obtain substantively the same light irradiation, so as to grow at a same growth rate.

For example, in the present embodiment, the plant cultivation device can further include a storage unit configured to store an objective illuminance value; of course, the storage unit also can store other data or programs. The storage unit can be a storage medium in any form, for example, magnetic storage medium (e.g., hard disk), optical storage medium (e.g., CD, DVD, Blu-Ray, or the like) or semiconductor storage medium (e.g., RAM, flash memory, resistive memory or the like) and the like, without limited in the present embodiment. As illustrated in FIG. 1B and FIG. 1C, the storage unit 106 for example can be disposed in the control unit.

For example, the objective illuminance value stored in the storage unit can include a maximum illuminance value and a minimum illuminance value; in such case, the control unit is configured to obtain the illuminance measurement of the illuminance detecting unit, compare the illuminance measurement with the maximum illuminance value and the minimum illuminance value, respectively, and adjust the lighting intensity according to a comparative result.

For example, the objective illuminance value can be different for different plant, thus the storage unit can store objective illuminance values of multiple types of plants, for example, maximum illuminance values and minimum illuminance values of multiple types of plants. As a result, it can retrieve the required objective illuminance value according to the type of the plant as cultivated.

For example, the control unit can be configured to adjust the lighting intensity of the lighting unit to allow the illuminance measurement of the illuminance detecting unit corresponding to the lighting unit to be in the range between the minimum illuminance value and the maximum illuminance value. That is, the control unit can be configured to lower the lighting intensity of the lighting unit corresponding to the illuminance detecting unit if the illuminance measurement of the illuminance detecting unit is greater than the maximum illuminance value of the corresponding plant, and to raise the lighting intensity of the lighting unit corresponding to the illuminance detecting unit if the illuminance measurement of the illuminance detecting unit is smaller than the minimum illuminance value of the corresponding plant. For example, the control unit raises or lowers the lighting intensity of the lighting unit by a same amount every time. In the present embodiment, with the adjustment described above, the intensity of light irradiation received by the plant can be maintained in a certain range, so that the plant can obtain a light irradiation with an objective intensity.

For example, in the present embodiment, the plant cultivation layer 102 can include a plurality of lighting units, and the plurality of lighting units are distributed in the plant cultivation layer 102, for example, the plurality of lighting units are distributed uniformly. For example, the plant cultivation layer 102 can correspondingly include a plurality of illuminance detecting units, and the plurality of illuminance detecting units are also distributed in the plant cultivation layer 102, for example, the plurality of illuminance detecting units are distributed uniformly. In the present embodiment, when a cultivation area of the plant cultivation layer is relatively large, a plurality of lighting units and a plurality of illuminance detecting units can be utilized to implement lighting and detecting, together, so that a plurality of plants cultivated in the plant cultivation layer all can receive the light irradiation with the objective intensity.

For example, the plant cultivation layer 102 can include a plurality of regions, for example, the plurality of regions are uniformly distributed, and a plurality of lighting units and a plurality of illuminance detecting units are uniformly distributed in the regions; in this way, for each of the regions, the illuminance detecting unit detects a light intensity in the region to obtain an illuminance measurement. In the present embodiment, the illuminance detecting unit in each of the regions can detect an illuminance of the region where it's located, thus the control unit can adjust the lighting intensity of the lighting unit in the region, so as to realize a regional control, and hence to adjust the intensity of light irradiation in the entire plant cultivation layer more accurately.

For example, each of the illuminance detecting units can be disposed to be corresponding to a lighting unit. It should be noted that, the "disposed to be corresponding to" as used in the present embodiment may refer to "disposed to be right opposite to", and may also refer to "disposed to be in adjacent to", and may also refer to "disposed at an common boundary between irradiation areas of lighting units", as long as the illuminance detecting unit can detect the light intensity of the light irradiating into the plant cultivation layer from the corresponding lighting unit.

For example, the plant cultivation layer includes a plant shelf, the plant shelf may be in a rectangle shape, the plurality of lighting units are uniformly distributed in the plant cultivation layer, and the plurality of illuminance detecting units are uniformly disposed on the plant shelf along one diagonal line of the plant shelf. On account of the symmetry of the rectangle, the illuminance detecting units disposed along the diagonal line can reflect an illuminance at a position where the illuminance detecting unit is disposed, and can also reflect an illuminance at another position symmetric with the position where the illuminance detecting unit is disposed, to a certain extent; in this way, the another position symmetric with the position where the illuminance detecting unit is disposed may not be provided with the illuminance detecting unit, which can reduce the number of illuminance detecting unit as arranged and save the cost.

Figure 3A:
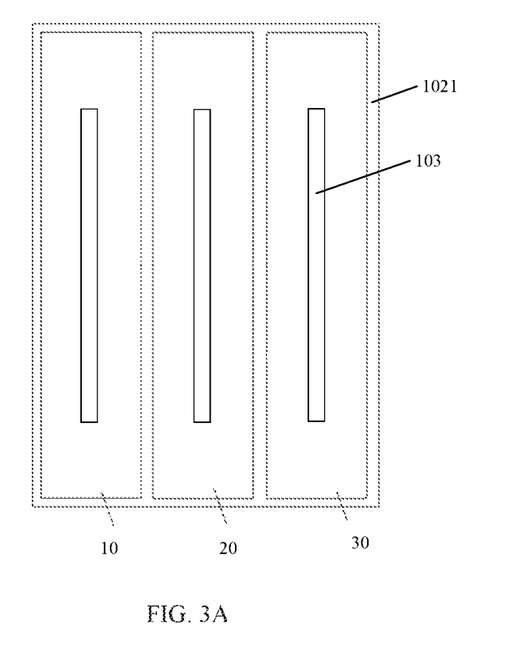
FIG. 3A is a schematic diagram illustrating an arrangement of a plurality of lighting units provided by another embodiment of the present disclosure.
Figure 3B:
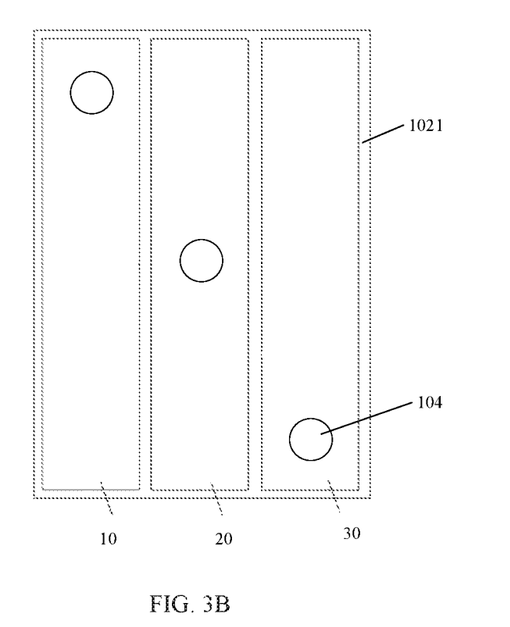
FIG. 3B is a schematic diagram illustrating an arrangement of a plurality of illuminance detecting units provided by another embodiment of the present disclosure.

For example, in the present embodiment, adjacent plant cultivation layers 102 are separated by a rectangular plant shelf 1021. For example, as illustrated in FIG. 3A, the plant shelf 1021 can be uniformly divided into three regions which are a first region 10, a second region 20 and a third region 30, respectively. For example, every region is provided with one lighting unit, which for example can be a line light source and can be disposed at a central position of the region of the plant shelf 1021. For example, as illustrated in FIG. 3B, every region is provided with one illuminance detecting unit. For example, the illuminance detecting unit is disposed on a surface of every region of the plant shelf 1021. In the first region 10, the illuminance detecting unit is disposed at a relatively upper position (with reference to an orientation in FIG. 3B); in the second region 20, the illuminance detecting unit is disposed at a central position; in the third region 30, the illuminance detecting unit is disposed at a relatively lower position. These three illuminance detecting units are uniformly arranged in these three regions substantially along one diagonal line of the plant shelf 1021. In such case, because the first region 10 is closer to the third region 30, and because the lighting units are arranged uniformly and symmetrically, the illuminance measurement detected by the illuminance detecting unit disposed at the relatively upper position in the first region 10 can also reflect the illuminance at the relatively upper position in the third region 30 which is symmetric with the relatively upper position in the first region 10, to a certain extent; similarly, the illuminance measurement detected by the illuminance detecting unit disposed at the relatively lower position in the third region 30 can also reflect the illuminance at the position symmetric with the relatively lower position in the first region 10 which is symmetric with the relatively lower position in the third region 30, to a certain extent, so as to achieve an evaluation of illuminances at multiple positions through only three illuminance detecting units.

Figure 4A:
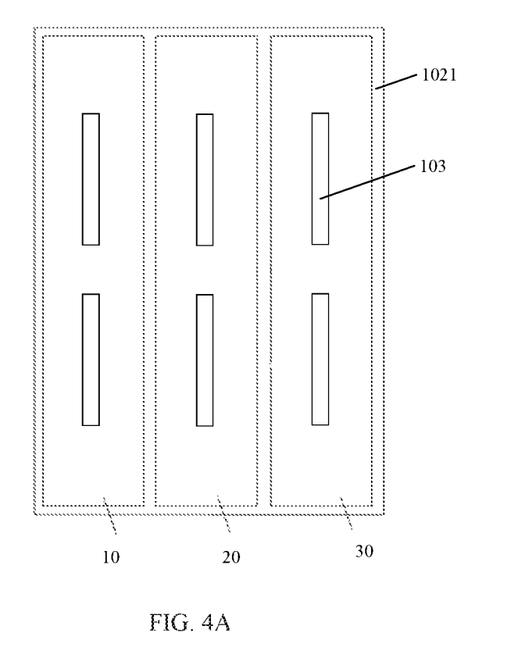
FIG. 4A is a schematic diagram illustrating an arrangement of a plurality of lighting units provided by yet another embodiment of the present disclosure.
Figure 4B:
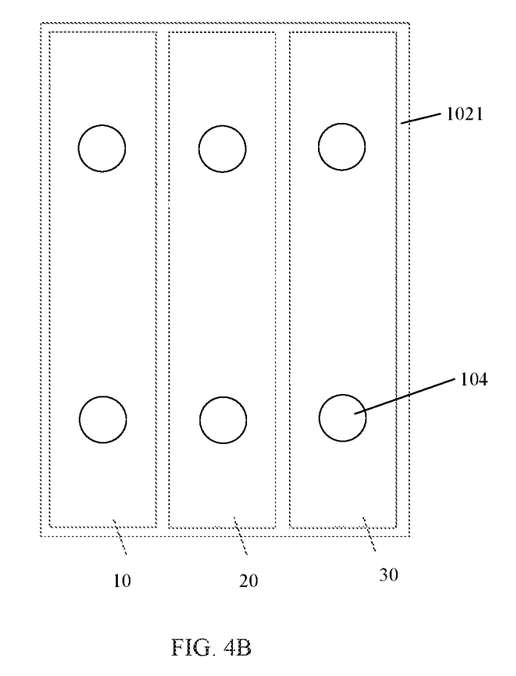
FIG. 4B is a schematic diagram illustrating an arrangement of a plurality of illuminance detecting units provided by yet another embodiment of the present disclosure.

In the present embodiment, the number and the position of the lighting unit and the illuminance detecting unit can also be arranged in other forms. For example, as illustrated in FIG. 4A, the plant shelf 1021 is uniformly divided into three regions, each of the three regions is provided with, for example, two lighting units 103, and the two lighting units 103 are uniformly distributed in each of the regions. For example, as illustrated in FIG. 4B, every region is provided with, for example, two illuminance detecting units 104. For example, in each of the regions, the illuminance detecting unit 104 is disposed to be corresponding to the lighting unit, for example, the illuminance detecting unit can be disposed to be right opposite to the lighting unit, and can also be disposed to be in adjacent to the lighting unit. Of course, in the present example, every region can also be, for example, provided with only one illuminance detecting unit 104, and the illuminance detecting unit 104 can also be arranged in the manner as illustrated in FIG. 3B.

Figure 5A:
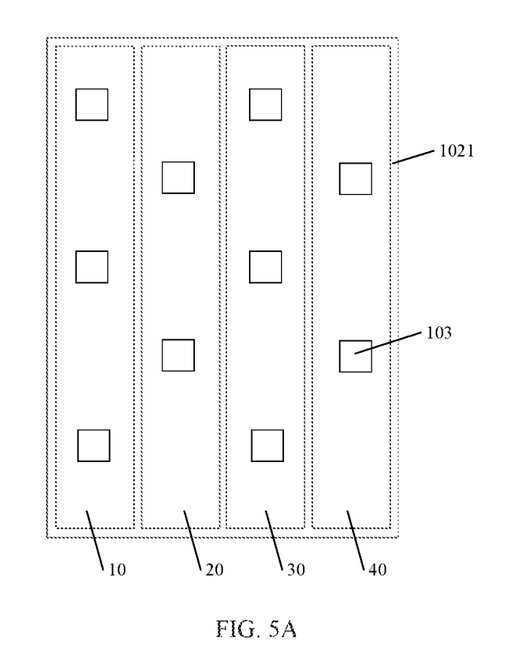
FIG. 5A is a schematic diagram illustrating an arrangement of a plurality of lighting units provided by further another embodiment of the present disclosure.
Figure 5B:
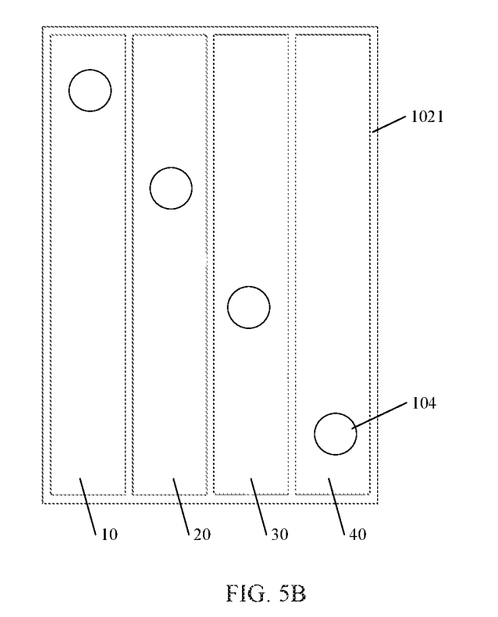
FIG. 5B is a schematic diagram illustrating an arrangement of a plurality of illuminance detecting units provided by further another embodiment of the present disclosure.

For example, as illustrated in FIG. 5A, in another embodiment, the plant shelf 1021 is uniformly divided into four regions, which are a first region 10, a second region 20, a third region 30 and a fourth region 40, respectively. In the present embodiment, the lighting unit can be, for example, a point light source, and multiple point light sources are uniformly distributed. For example, the point light sources in adjacent two regions are distributed alternately. For example, as illustrated in FIG. 5A, the first region 10 is uniformly provided with three point light sources, the second region 20 is uniformly provided with two point light sources, and the two point light sources disposed in the second region 20 are alternated with the three point light sources disposed in the first region 10; the point light sources in the third region 30 and the fourth region 40 are as same as that in the first region 10 and the second region 20, respectively. For example, as illustrated in FIG. 5B, each of the four regions is provided with one illuminance detecting unit, and these four illuminance detecting units are uniformly arranged in the four regions substantially along one diagonal line of the plant shelf 1021. Of course, in order to improve the detection accuracy of illuminance in the plant cultivation layer, it's also possible to arrange one illuminance detecting unit for every lighting unit. In the present embodiment, the correspondence relationship between the lighting unit and the illuminance detecting unit can also be selected and adjusted according to demands, without limited in the present embodiment.

It should be noted that, in the embodiment above, the division of regions in the plant shelf 1021 can also be made along a width direction of the rectangular plant shelf 1021, and can also be made along both of a length direction and the width direction of the rectangular plant shelf 1021, without limited in the present embodiment. For example, when the lighting unit is a line light source, an extension direction of the line light source can also be the width direction of the plant shelf 1021 and the like, without limited in the present embodiment.

It should be noted that, the plant shelf can also be implemented in other ways, for example, by hanging the plant and adjusting the position of the plant through adjusting a length of a rope on which the plant is hanging, without limited in the present embodiment.

In the present embodiment, when the plant cultivation layer is provided with a plurality of lighting units and a plurality of illuminance detecting units, the control unit can be configured to obtain illuminance measurements of the plurality of illuminance detecting units and to adjust the lighting intensities of the plurality of lighting units, so that the illuminance measurement of one or more illuminance detecting unit corresponding to each of the lighting units is in the range between the maximum illuminance value and the minimum illuminance value.

For example, when the illuminance measurements of the plurality of illuminance detecting units obtained by the control unit are all located in the range between the maximum illuminance value and the minimum illuminance value, that is, when each of the illuminance measurements of the plurality of illuminance detecting units is smaller than the maximum illuminance value of the corresponding plant and greater than the minimum illuminance value of the corresponding plant, the control unit stops adjusting the lighting intensity of the lighting unit. Or, when a difference between the maximum illuminance value and the minimum illuminance value is relatively large and the plant as cultivated is relatively sensitive to the uniformity of light irradiation, the control unit can be, for example, configured to compare the maximum illuminance value with the minimum illuminance value to obtain a first difference value. If the first difference value is smaller than or equal to a predetermined difference value (a predetermined, permitted illuminance range in the control unit), the control unit no longer adjusts the lighting intensity of the lighting unit. If the first difference value is greater than the predetermined difference value, the control unit calculates an average value of the illuminance measurements, compares the average value with a maximum illuminance measurement and a minimum illuminance measurement, respectively, to obtain a second difference value and a third difference value, respectively. If the second difference value is greater than the third difference value, that is, if the maximum illuminance measurement is far away from the average value, the control unit lowers the lighting intensity of the lighting unit in the region corresponding to the maximum illuminance measurement. If the second difference value is smaller than or equal to the third difference value, that is, if the minimum illuminance measurement is far away from the average value, the control unit is configured to raise the lighting intensity of the lighting unit in the region corresponding to the minimum illuminance measurement, until the first difference value between the maximum illuminance measurement and the minimum illuminance measurement is smaller than or equal to a predetermined difference value. In this way, the intensity of light irradiation received by the plants in different plant cultivation layers or by the plants in different regions of each of the plant cultivation layers can be adjusted to be in the objective intensity range.

For example, the lighting intensity of the lighting unit can be adjusted by adjusting a current intensity in the lighting unit. For example, the current intensity in the lighting unit can be raised or lowered by a same amount every time; for example, the current intensity in the lighting unit can be raised or lowered by 10 mA every time, and a detection of illuminance is performed, again, after every time of adjustment.

For example, the predetermined difference value can be set as 0-300 lux, for example, 30 lux, 50 lux, 100 lux, 150 lux, 200 lux, and the like. The predetermined difference value can be selected according to the type of the plant and the requirement on the uniformity of light irradiation, without limited in the present embodiment.

For example, the control unit can be configured to adjust the lighting intensity of the lighting unit in real time, so as to ensure the uniformity of light irradiation in the plant cultivation layer.

For example, in the present embodiment, the illuminance detecting unit can be a light irradiation detecting device in any form, e.g., optical sensor or the like; the lighting unit can be a lighting device such as LED lamp, fluorescent lamp and incandescent lamp. For example, the lighting unit can include one or more selected from the group consisting of LED lamp, fluorescent lamp and incandescent lamp, without limited in the present embodiment. For example, the lighting unit can include LED lamps emitting light with colors different from each other so that the light with different colors (e.g., red light, green light, blue light, and the like) can be mixed with each other to obtain white light; at the same time, it allows for adjusting a parameter of components of different colors in the white light, such as an intensity.

For example, because different plants may have different sensitivities to light having different wavelengths, the wavelength of the light emitted from the lighting unit can be adjusted, for example, in the present embodiment. For example, a wavelength range of light emitted from the lighting unit can be adjusted to be as same as that of sunlight; for example, the growth of some plants may need blue light having a wavelength in the range of 380-510 nm or red light having a wavelength in the range of 610-780 nm; in such case, the wavelength of the light emitted from the lighting unit can be adjusted to the range as required.

For example, each of the plurality of plant cultivation layers in the plant cultivation device is uniformly distributed with a plurality of illuminance detecting units and a plurality of lighting units, and the control unit can adjust the lighting intensity of the lighting unit in different plant cultivation layers to different values, respectively. For example, when the plant cultivation layers are cultivated with different types of plants, the control unit can adjust the lighting intensity of the lighting unit in each of the plant cultivation layers to an intensity of light irradiation required by the plant cultivated in the plant cultivation layer. For example, the control unit can also adjust the lighting intensity of the lighting unit in every plant cultivation layer to a same value; for example, when different plant cultivation layers are cultivated with the same plant, the control unit is configured to obtain the measurement of each of the illuminance detecting units in every plant cultivation layer and to adjust each of the lighting units in every plant cultivation layer, so as to achieve an uniformity of the light irradiation in the entire plant cultivation device.

For example, the plant cultivation device can be disposed outdoors, then a top plant cultivation layer included in the plant cultivation device may not be provided with the lighting unit and/or the illuminance detecting unit, and the plant cultivated in the top plant cultivation layer is irradiated by the sunlight. For example, the plant cultivation device can also be disposed indoors, for example, in a glass greenhouse, then the top plant cultivation layer included in the plant cultivation device can be provided with both of the lighting unit and the illuminance detecting unit, and the control unit can also be configured to adjust the lighting unit in the top plant cultivation layer so that the light irradiation of each of the plant cultivation layers can achieve the intensity as required.

By performing plant cultivation through using the plant cultivation device provided by the embodiments of the present disclosure, the plant can obtain light irradiation with an objective intensity. When plants of the same type are cultivated in batches, they can obtain light irradiation with substantially the same intensity, so that the plants can have substantially the same growth rate, which increases the quality of the products and lowers the cost of sorting the products.

At least one embodiment of the present disclosure provides a plant cultivation method, including: irradiating a plant cultivated in at least one plant cultivation layer by using a lighting unit; detecting a light irradiation received by the plant in the plant cultivation layer to obtain an illuminance measurement; and adjusting a lighting intensity of the lighting unit according to the illuminance measurement.

Figure 6:
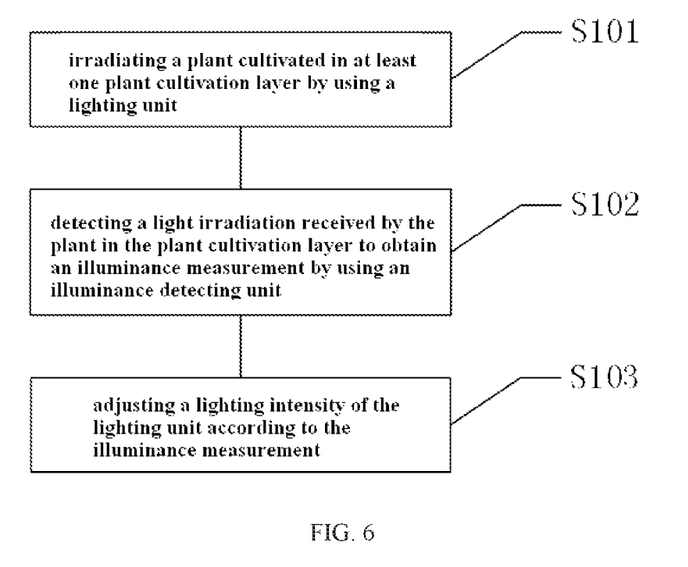
FIG. 6 is a flow chart of a plant cultivation method provided by an embodiment of the present disclosure.

For example, as illustrated in FIG. 6, the method provided by the present embodiment can include steps as below.

Step S101, irradiating a plant cultivated in at least one plant cultivation layer by using a lighting unit.

For example, the plant can be cultivated in a plant cultivation device provided with a plurality of plant cultivation layers. Because these plant cultivation layers may be blocked by each other, a light irradiation obtained by a plant in a lower plant cultivation layer may be not sufficient for its growth. In such case, a lighting unit can be utilized to irradiate this plant to provide the plant with sufficient light irradiation.

For example, the lighting unit can be a lighting device such as LED lamp, fluorescent lamp and incandescent lamp. For example, the lighting unit can include one or more selected from the group consisting of LED lamp, fluorescent lamp and incandescent lamp, without limited in the present embodiment. For example, the lighting unit can include LED lamps emitting light with colors different from each other so that the light with different colors (e.g., red light, green light, blue light, and the like) can be mixed with each other to obtain white light; at the same time, it allows for adjusting a parameter of components of different colors in the white light, such as an intensity.

For example, because different plants may have different sensitivities to light having different wavelengths, the wavelength of the light emitted from the lighting unit can be adjusted, for example, in the present embodiment. For example, a wavelength range of light emitted from the lighting unit can be adjusted to be as same as that of sunlight; for example, the growth of some plants may need blue light having a wavelength in the range of 380-510 nm or red light having a wavelength in the range of 610-780 nm; in such case, the wavelength of the light emitted from the lighting unit can be adjusted to the range as required.

Step S102, detecting a light irradiation received by the plant in the plant cultivation layer to obtain an illuminance measurement.

For example, because the growth of different plants require for different intensities of light irradiation, or, because plants at different positions in a plant cultivation layer may be subjected to different intensities of light irradiation due to factors such as circumstance, it can determine whether the light emitted from the lighting unit satisfies the requirements of the plant by detecting the intensities of light irradiation received by plants at different positions through the illuminance detecting unit.

In the present embodiment, the illuminance detecting unit can be a light irradiation detecting device in any form, for example, an optical sensor or the like, without limited in the present embodiment.

Step S103, adjusting a lighting intensity of the lighting unit according to the illuminance measurement.

In the present embodiment, for example, it can set an objective illuminance value, and compare the illuminance measurement with the objective illuminance value, so as to adjust the lighting intensity of the lighting unit.

For example, in the present embodiment, setting an objective illuminance value includes setting a maximum illuminance value and a minimum illuminance value of the plant; then obtaining the illuminance measurement of the illuminance detecting unit, comparing the illuminance measurement with the maximum illuminance value and the minimum illuminance value, respectively, and adjusting the lighting intensity of the lighting unit according to a comparative result.

For example, different objective illuminance values may be configured for different plants. As a result, it can retrieve the required objective illuminance value according to the type of the plant as cultivated.

For example, it can adjust the lighting intensity of the lighting unit to allow the illuminance measurement of the illuminance detecting unit corresponding to the lighting unit to be in the range between the minimum illuminance value and the maximum illuminance value.

Figure 7:
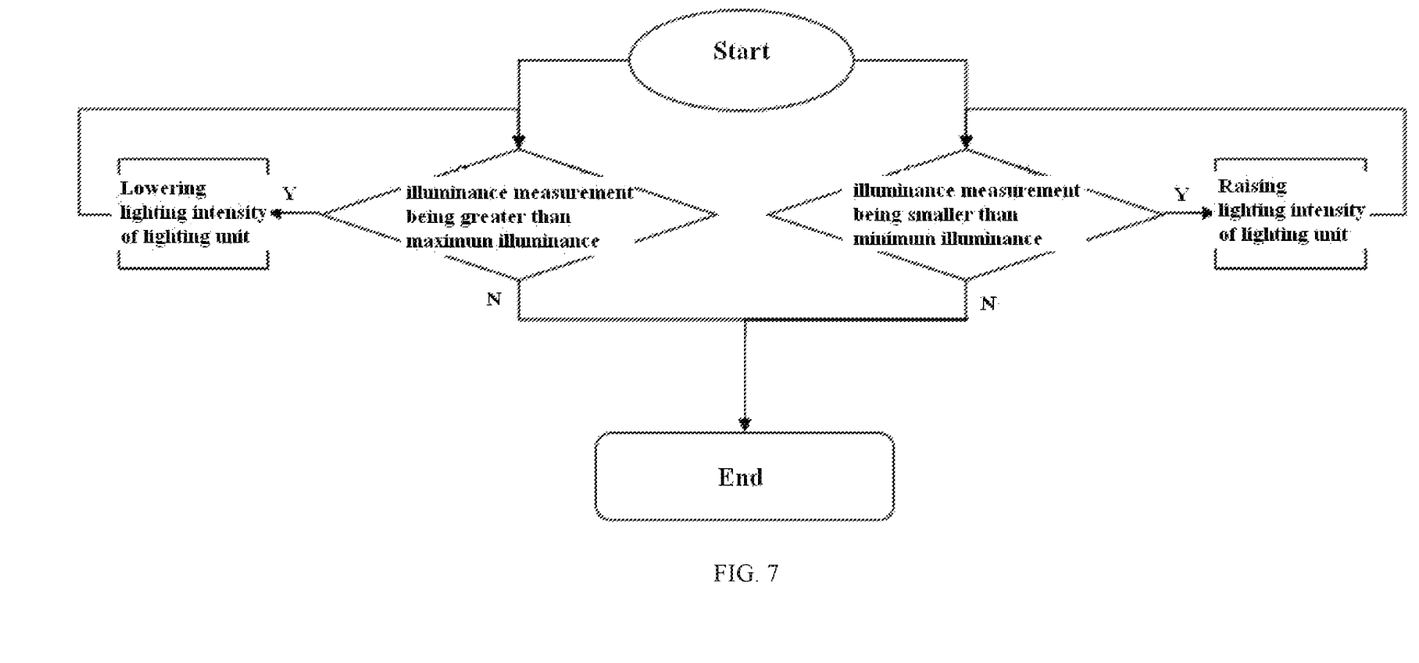
FIG. 7 is a flow chart of a plant cultivation method provided by another embodiment of the present disclosure.

For example, as illustrated in FIG. 7, when the illuminance measurement of the illuminance detecting unit is greater than the maximum illuminance value of the corresponding plant, it can lower the lighting intensity of the lighting unit corresponding to the illuminance detecting unit; when the illuminance measurement of the illuminance detecting unit is smaller than the minimum illuminance value of the corresponding plant, it can raise the lighting intensity of the lighting unit corresponding to the illuminance detecting unit. For example, the lighting intensity of the lighting unit can be raised or lowered by a same amount every time.

For example, each of the at least one plant cultivation layer is divided uniformly into a plurality of regions, the lighting unit is utilized in each of the regions to irradiate the plant, and the illuminance detecting unit is utilized to detect the light irradiation received by the plant so as to obtain the illuminance measurement; then the lighting intensity of the lighting unit is adjusted according to the illuminance measurement.

For example, a plurality of illuminance detecting units can be utilized to detect the light irradiation received by plants in different plant cultivation layers or in different regions of every plant cultivation layer. Obtaining illuminance measurements of the plurality of illuminance detecting units, and stopping adjusting the lighting intensity of the lighting unit upon the illuminance measurements of the plurality of illuminance detecting units being all in the range between the minimum illuminance value and the maximum illuminance value.

Figure 8:
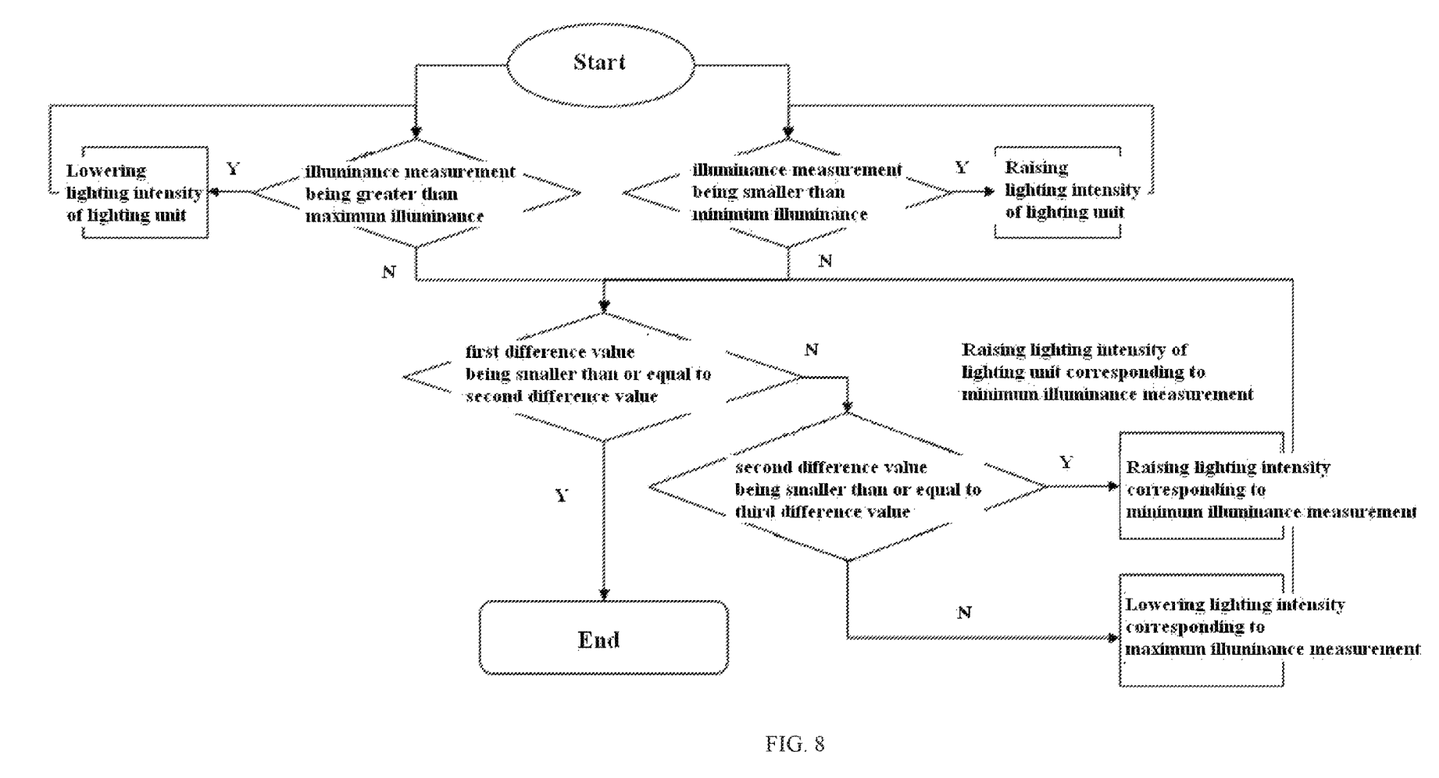
FIG. 8 is a flow chart of a plant cultivation method provided by yet another embodiment of the present disclosure.

For example, as illustrated in FIG. 8, in the case where a plurality of illuminance detecting units is utilized to detect the light irradiation received by the plants in the plant cultivation layer and illuminance measurements of the plurality of illuminance detecting units are obtained, if a difference between the maximum illuminance value and the minimum illuminance value is relatively large, and if the plant as cultivated is relatively sensitive to light irradiation and hence has higher requirement on the uniformity of the light irradiation received by plants in different plant cultivation layers or in different regions of every plant cultivation layer, the lighting intensity of each of the lighting units can be further adjusted. For example, it can compare a maximum illuminance measurement with a minimum illuminance measurement to obtain a first difference value. If the first difference value is smaller than or equal to a predetermined difference value, the lighting intensity of the lighting unit is no longer adjusted. If the first difference value is greater than the predetermined difference value, it can calculate an average value of the illuminance measurements, compare the average value with the maximum illuminance measurement and the minimum illuminance measurement, respectively, to obtain a second difference value and a third difference value, respectively. If the second difference value is greater than the third difference value, that is, if the maximum illuminance measurement is far away from the average value, it can lower the lighting intensity of the lighting unit in the region corresponding to the maximum illuminance measurement. If the second difference value is smaller than or equal to the third difference value, that is, if the minimum illuminance measurement is far away from the average value, it can raise the lighting intensity of the lighting unit in the region corresponding to the minimum illuminance measurement, until the first difference value between the maximum illuminance measurement and the minimum illuminance measurement among the illuminance measurements of the plurality of illuminance detecting units is smaller than or equal to the predetermined difference value. In this way, the intensity of light irradiation subjected by the plants in different plant cultivation layers or by the plants in different regions of each of the plant cultivation layers can be adjusted to be in the objective intensity range.

For example, the predetermined difference value can be set as 0-300 lux, for example, 30 lux, 50 lux, 100 lux, 150 lux, 200 lux, and the like. The predetermined difference value can be selected according to the type of the plant and the requirement on the uniformity of light irradiation, without limited in the present embodiment.

For example, the lighting intensity of the lighting unit can be adjusted according to the illuminance measurement in real time, so as to ensure the uniformity of light irradiation in the plant cultivation layer.

For example, a control unit can be utilized to perform the step of adjusting the lighting intensity of the lighting unit according to the illuminance measurement. For example, the control unit can be a controller in any form, for example, a microcontroller, a single chip, a programmable logic controller (PLC), a personal computer or the like, without limited in the present embodiment.

For example, a storage unit can be utilized to store the objective illuminance value. The storage unit can be a storage medium in any form, for example, magnetic storage medium, optical storage medium or semiconductor storage medium, without limited in the present embodiment. The storage unit for example can be disposed in a controller.

By performing plant cultivation through using the plant cultivation method provided by the present disclosure, it allows the plant to obtain light irradiation with the objective intensity. When plants of the same type are cultivated in batches, they can obtain light irradiation with substantially the same intensity so as to grow at the substantially same growth rate.

The following statements should be noted:

(1) The accompanying drawings involve only the structure(s) in connection with the embodiment(s) of the present disclosure, and other structure(s) can be referred to common design(s).

(2) For the purpose of clarity only, in accompanying drawings for illustrating the embodiment(s) of the present disclosure, the thickness and size of a layer or a structure may be enlarged. However, it should understood that, in the case in which a component or element such as a layer, film, area, substrate or the like is referred to be "on" or "under" another component or element, it may be directly on or under the another component or element or a component or element is interposed therebetween.

(3) In case of no conflict, features in one embodiment or in different embodiments can be combined.

The above are only specific implementations of the present disclosure, without limiting the protection scope of the present disclosure thereto. Any changes or substitutions easily occur to those skilled in the art within the technical scope of the present disclosure should be covered in the protection scope of the present disclosure. Therefore, the protection scope of the present disclosure should be based on the protection scope of the claims.

What is claimed is:

1. A plant cultivation device, comprising:
a holder comprising at least one plant cultivation layer;
a lighting unit in the at least one plant cultivation layer, the lighting unit being configured to emit light irradiating a plant cultivated in the plant cultivation layer;
an illuminance detecting unit configured to detect an illuminance in the plant cultivation layer to obtain an illuminance measurement;
a control unit configured to obtain the illuminance measurement and adjust a lighting intensity of the lighting unit according to the illuminance measurement; and
a storage unit configured to store an objective illuminance value, wherein
the objective illuminance value comprises a maximum illuminance value and a minimum illuminance value; and
the control unit is configured to obtain the illuminance measurement of the illuminance detecting unit, compare the illuminance measurement with the maximum illuminance value and the minimum illuminance value, respectively, and adjust the lighting intensity of the lighting unit according to a comparative result.

2. The plant cultivation device according to claim 1, wherein
the plant cultivation device comprises a plurality of lighting units, and the plurality of lighting units are distributed in the plant cultivation layer.

3. The plant cultivation device according to claim 2, wherein
the plant cultivation device comprises a plurality of illuminance detecting units, and the plurality of illuminance detecting units are distributed in the plant cultivation layer.

4. The plant cultivation device according to claim 3, wherein the plant cultivation layer comprises a plant shelf in a rectangle shape, the plurality of lighting units are disposed uniformly in the plant cultivation layer, and the plurality of illuminance detecting units are disposed uniformly on the plant shelf along one diagonal line of the plant shelf.

5. The plant cultivation device according to claim 3, wherein the plant cultivation layer comprises a plurality of regions, and the plurality of illuminance detecting units and the plurality of lighting units are distributed uniformly in the plurality of regions.

6. The plant cultivation device according to claim 1, wherein the lighting unit comprises one or more selected from the group of LED lamp, fluorescent lamp and incandescent lamp.

7. The plant cultivation device according to claim 1, comprising a plurality of plant cultivation layers.

8. The plant cultivation device according to claim 1, further comprising a top plant cultivation layer on the at least one plant cultivation layer, and the top plant cultivation layer is not provided with the lighting unit and the illuminance detecting unit.

9. A plant cultivation method, comprising:
irradiating a plant cultivated in at least one plant cultivation layer by using a lighting unit;
detecting a light irradiation received by the plant in the plant cultivation layer to obtain an illuminance measurement; and
adjusting a lighting intensity of the lighting unit according to the illuminance measurement, further comprising:
setting an objective illuminance value comprising a maximum illuminance value and a minimum illuminance value,
obtaining the illuminance measurement of the illuminance detecting unit, comparing the illuminance measurement with the maximum illuminance value and the minimum illuminance value, respectively, and adjusting the lighting intensity of the lighting unit according to a comparative result.

10. The plant cultivation method according to claim 9, wherein
adjusting the lighting intensity of the lighting unit so that the illuminance measurement of the illuminance detecting unit corresponding to the lighting unit is in the range between the minimum illuminance value and the maximum illuminance value.

11. The plant cultivation method according to claim 9, wherein
detecting the light irradiation received by the plant in the plant cultivation layer by using a plurality of illuminance detecting units, and obtaining illuminance measurements of the plurality of illuminance detecting units; and
stopping adjusting the lighting intensity of the lighting unit if the illuminance measurement of the illuminance detecting unit is in the range between the minimum illuminance value and the maximum illuminance value.

12. The plant cultivation method according to claim 9, wherein
detecting the light irradiation received by the plant in the plant cultivation layer by using a plurality of illuminance detecting units, and obtaining illuminance measurements of the plurality of illuminance detecting units;
comparing a maximum illuminance measurement with a minimum illuminance measurement to obtain a first difference value, and stopping adjusting the lighting intensity of the lighting unit upon the first difference value being smaller than or equal to a predetermined difference value;
calculating an average value of the illuminance measurements upon the first difference value being greater than the predetermined difference value, comparing the average value with the maximum illuminance measurement to obtain a second difference value and comparing the average value with the minimum illuminance measurement to obtain a third difference value; lowering the lighting intensity of the lighting unit corresponding to the maximum illuminance measurement upon the second difference value being greater than the third difference value, and raising the lighting intensity of the lighting unit corresponding to the minimum illuminance measurement upon the second difference value being smaller than or equal to the third difference value, until the first difference value between the maximum illuminance measurement and the minimum illuminance measurement among the illuminance measurements of the plurality of illuminance detecting units is smaller than or equal to the predetermined difference value.

13. The plant cultivation method according to claim 9, wherein uniformly dividing the plant cultivation layer into a plurality of regions, and for the region, irradiating the plant by using the lighting unit; detecting the light irradiation received by the plant by using an illuminance detecting unit to obtain the illuminance measurement; and adjusting the lighting intensity of the lighting unit according to the illuminance measurement.

14. The plant cultivation method according to claim 9, wherein adjusting the lighting intensity of the lighting unit according to the illuminance measurement in real time.

15. The plant cultivation method according to claim 9, wherein the lighting unit comprises one or more selected from the group consisting of LED lamp, fluorescent lamp and incandescent lamp.

* * * * *